United States Patent [19]

Guhl et al.

[11] Patent Number: 5,456,943

[45] Date of Patent: Oct. 10, 1995

[54] METHOD FOR THE PREPARATION OF ELECTRICALLY CONDUCTIVE INFRARED-REFLECTING LAYERS ON GLASS, GLASS-CERAMIC OR ENAMEL SURFACES

[75] Inventors: Dieter Guhl, Hattingen; Sven-Uwe Vallerien, Essen, both of Germany

[73] Assignee: Th. Goldschmidt AG, Essen, Germany

[21] Appl. No.: 300,290

[22] Filed: Sep. 2, 1994

[30] Foreign Application Priority Data

Sep. 3, 1993 [DE] Germany .......................... 43 29 651.3

[51] Int. Cl.⁶ ....................................................... B05D 5/12
[52] U.S. Cl. ........................ 427/126.2; 427/160; 427/229; 427/42
[58] Field of Search ................................. 427/126.2, 160, 427/421, 229

[56] References Cited

U.S. PATENT DOCUMENTS

| | | | |
|---|---|---|---|
| 2,566,346 | 9/1951 | Lytle et al. | 117/54 |
| 4,265,974 | 5/1981 | Gordon | 428/432 |
| 4,293,594 | 10/1981 | Yoldas et al. | 427/107 |

FOREIGN PATENT DOCUMENTS

| | | | |
|---|---|---|---|
| 0158399 | 10/1985 | European Pat. Off. | C03C 17/245 |
| 0312879 | 4/1989 | European Pat. Off. | C03C 17/25 |
| 37355911 | 10/1987 | Germany | C03C 17/25 |
| 3735574 | 5/1989 | Germany | C03C 17/25 |

OTHER PUBLICATIONS

Yi, "Sol–Gel Processing of Complex Oxide Films" Ceramic Bulletin vol. 70 No. 7 1991 pp. 1173–1179.

*Primary Examiner*—Shrive Beck
*Assistant Examiner*—Benjamin L. Utech
*Attorney, Agent, or Firm*—Anderson Kill Olick & Oshinsky

[57] ABSTRACT

A method is described for the preparation of electrically conductive, infrared-reflecting layers on glass, glass-ceramic or enamel surfaces by spraying and thermally decomposing liquid Sn(IV) compounds and fluorine compounds as preparations containing doping agents on to the surface heated to 400° to 800° C., yet below their softening point, wherein, as liquid preparations, ionically stabilized, organic tin(IV) acid sols are used, which contain aliphatic alcohols or ketones with, in each case, at most 6 carbon atoms in the molecule or esters with a boiling point below 180° C. as liquid, organic medium, as well as fluoride ions in an adequate amount for doping. The preparations are homogenous, stable for a long time, and can readily be diluted with alcohols, ketones, and other polar solvents. The tin oxide layers, produce with the preparations on the substrates, have a high transparency in the wavelength of visible light, a low surface resistance and a high reflection in the infrared wavelength region.

7 Claims, No Drawings

METHOD FOR THE PREPARATION OF ELECTRICALLY CONDUCTIVE INFRARED-REFLECTING LAYERS ON GLASS, GLASS-CERAMIC OR ENAMEL SURFACES

FIELD OF THE INVENTION

The invention relates to a method for the preparation of electrically conductive, infrared-reflecting layers on glass, glass-ceramic or enamel surfaces by spraying and thermally decomposing liquid Sn(IV) compounds and fluorine compounds as preparations containing doping agents on to the said surfaces heated to 400° to 800° C., yet below their softening point.

BACKGROUND INFORMATION AND PRIOR ART

It is well known that electrically conductive, fluorine-doped tin oxide layers on glass surfaces decrease the electrical resistance of the surfaces so coated, as well as increase the infrared reflection. To produce such layers, suitable tin compounds (basic compounds) along with a fluorine-emitting compound (doping agent) are brought simultaneously into contact with the glass surface that has been heated to 400° to 800° C. The basic tin compound forms a coherent tin oxide layer on the surface of the glass, the glass-ceramic or the enamelization. The fluorine from the doping agent increases the electric conductivity and brings about the high infrared reflection.

From an engineering point of view, the spraying of suitable tin-containing and fluorine-containing solutions for applying the fluorine-doped tin oxide layers on the surfaces is particularly simple.

A liquid preparation for producing high-grade, fluorine-doped tin oxide layers on glass surfaces is described in the European publication 0 158 399. The preparation consists of a) 1 to 30% by weight of a doping agent based on an organic fluorine compound, selected from trifluoroacetic acid or its anhydride, ethyl trifluoroacetate, trifluoroethanol and pentafluoropropionic acid, and b) 70 to 99% by weight of an organic tin compound, selected from alkyl tin trichloride, dialkyl tin dichloride, alkyl dichloro tin acetate, alkyl chloro tin diacetate, an ester of tin chloride or tin tetrachloride.

This method, however, is not satisfactory, since the fluorine-containing doping agents, because of their low boiling point, largely evaporate ineffectively at the hot glass surface and thus are not incorporated in the tin oxide layer. In addition, the hot surface of the substrate is strongly cooled by this effect. This is disadvantageous for a homogeneous layer build-up and further deteriorates the optical and functional properties.

The European patent 0 312 879 discloses a preparation, which consists of tin tetrachloride or alkyl tin trichloride with tin(II) fluoroborate in a polar organic solvent.

As doping agent, tin(II) fluorosilicate is used according to the German patent 37 35 591 and Tin(II) fluoride is used according to the German patent 37 35 574.

However, the high chlorine content is the main disadvantage of these preparations. One of the products of pyrolysis is hydrogen chloride, which represents a danger to health and can attack and damage materials.

The invention is concerned with the technical problem of finding a preparation which has the following properties profile:

(i) the preparation shall be homogeneous and already contain the doping agent;

(ii) the preparation shall be stable for a long time and be readily dilutable with alcohols, ketones, esters and other polar solvents;

(iii) the chloride content of the preparation shall be minimized; and (iv) The tin oxide layers, produced on the substrates with the preparations, shall have a high transparency in the visible light wavelength region, as low a surface resistance as possible and a high reflection in the infrared wavelength region.

OBJECT OF THE INVENTION

An object of the present invention is a method for preparing electrically conductive, infrared-reflecting layers on glass, glass-ceramic or enamel surfaces.

SUMMARY OF THE INVENTION

Surprisingly, these requirements are fulfilled by a preparation, which is characterized in that as liquid preparations, ionically stabilized, organic tin(IV) acid sols are used, which contain aliphatic alcohols or ketones with, in each case, at most 6 carbon atoms in the molecule or esters with a boiling point below 180° C. as liquid, organic medium, as well as fluoride ions in an adequate amount for doping.

A preferred method is characterized in that a tin(IV) acid sol is sprayed on, which is obtained by reacting a basic tin compound, which is selected from the group comprising tin(II) chloride, tin(II) oxalate and tin(II) acetate, with hydrogen peroxide in set organic medium, the doping agent being added during or after the formation of the tin(IV) acid sol.

Preferably, the doping agent is already present before the sol is formed. A further preferred method, therefore, consists therein that a tin(IV) acid sol is obtained by reacting the basic tin compound, with a compound containing tin and fluorine as doping agent selected from the group comprising tin(II) fluoride and tin(II) trifluoroacetate, in presence of hydrogen peroxide in said organic medium.

A different method consists therein that the doping agent is subsequently added to the already formed tin(IV) acid sol and that hydrofluoric acid, trifluoroacetic acid or its anhydride, tin(II) fluoride or hexafluorosilicic acid is used as doping agent.

It is possible to increase the tin content of the tin(IV) acid sol by the addition of alkyl tin oxides, wherein the alkyl group(s) can contain up to six carbon atoms. Examples of suitable alkyl tin oxides are monobutyl tin oxide and dibutyl tin oxide. By these means, chloride contents, which are reduced even more, can be achieved in dilutions of the same tin content.

Preferably, tin(IV) acid sols are used, which contain 100 to 1,200 g/L of tin and particularly 200 to 500 g/L of tin, the molar ratio of tin to fluorine being 1:0.1 to 1:0.8.

Examples of the organic medium are alcohols, such as ethanol and isopropanol, ketones such as acetone and esters such as butyl acetate.

The organic medium, preferably alcohols are used in order to obtain colloidal precipitates and to prevent crystal growth. The primary particle size within these sols is determined by means of transmission electron microscopy and is about 5 nm. The tin(IV) acid sol solutions are resistant to hydrolysis; no precipitates are obtained even after prolonged standing.

To carry out the inventive coating, the preparation, which is to be used for the inventive method, is sprayed by means of a compressed-air operated spray gun in a spray atomizing method on the previously heated surfaces. For this, the substrate should have a temperature of 400° to 800° C.; however, the temperature must remain below the melting point or softening point of the substrate. A fluorine-doped tin oxide layer is to be used on these surfaces by pyrolysis. The thickness of this coating can be varied between 100 nm and 2 μm. The layers produced by this method using the inventive preparations, are distinguished by a high transparency for visible light (75% to 88%). The integral infrared reflection at wavelengths from 2.5 to 15 μm is greater than 80%.

The following examples serve to explain the invention further, it being understood that the Examples are provided by way of illustration and not by way of limitation.

EXAMPLES 1

A suspension of 16.5 g of tin(II) fluoride and 113.9 g of tin(II) chloride in 82.8 g of ethanol is added to a 500 mL multi-neck flask equipped with a KPG stirrer. While stirring slowly, 34.3 g of a 70% hydrogen peroxide solution is slowly added dropwise over a period of two hours. During the addition, the reaction temperature should not exceed 35° C. A clear solution is obtained. It is diluted to 50% with ethanol and then sprayed onto a flat glass plate (160 mm×180 mm×6 mm) which previously had been heated for five minutes at a furnace temperature of 700° C.

The glass plate, coated in this manner with a Walther hand spray gun (with a nozzle diameter of 1 mm and a spraying pressure of 4 bar) with seven mL of solution for a period of 5 seconds, has the following values after cooling:

surface resistance: 9 ohm/square
IR reflection: 89%
layer thickness: 600 nm

EXAMPLE 2

An ethanolic tin(IV) acid sol, stabilized with chloride and having a tin content of 497 g/L, is doped with by weight of a 40% hydrofluoric acid solution. The solution is then diluted with ethanol to a content of 45%.

After it has cooled down, the flat glass plate, coated with the above solution, has the following properties:

surface resistance: 12 ohm/square
IR reflection: 84%
layer thickness: 800 nm

EXAMPLE 3

Ethanolic tin(IV) acid sol from example 1, stabilized with fluoride and chloride is used. In addition, 29.8 g of monobutyl tin oxide (MBTO) is dissolved in the solution, which is then diluted with ethanol 37.5%.

After it has cooled down the flat glass plate, coated with the above solution, has the following properties:

surface resistance: 9 ohm/square
IR reflection: 91%
layer thickness: 700 nm

EXAMPLE 4

Isopropanolic tin(IV) acid sol (with a molar ratio of Cl:F of 1:0.15), stabilized with fluoride and chloride and having a tin content of 347 g/L, is sprayed undiluted onto a clear glass plate. The following values are obtained:

surface resistance: 18 ohm/square
IR reflection: 81%
layer thickness: 850 nm

EXAMPLE 5

Tin(IV) acid sol (with a molar ratio of Cl:F of 1:0.2) in acetone as solvent, stabilized with fluoride and chloride and having a tin content of 287 g/L, is sprayed undiluted onto a previously heated flat glass plate. The following values are obtained:

surface resistance: 19 ohm/square
IR reflection: 79%
layer thickness: 800 nm

EXAMPLE 6

Tin (IV) acid sol, with a molar ratio of trifluoroacetate:acetate of 0.3:1, in ethanol as solvent and having a tin content of 312 g/L, is sprayed undiluted onto a previously heated flat glass plate. The following values are obtained:

surface resistance: 31 ohm/square
IR reflection: 69%
layer thickness: 750 nm

We claim:

1. A method of preparing an electrically, conductive, infrared-reflecting layer on a glass, glass-ceramic or enamel surface having a softening point, comprising:

forming a liquid organic tin (IV) acid sol composition, and doping said liquid organic tin (IV) acid sol composition with a fluorine containing compound, heating said surface to 400° C. to 800° C. below its softening point, and spraying and decomposing said composition unto said substrate, wherein said liquid organic tin (IV) acid sol composition comprises aliphatic alcohols or ketones both having, at most, 6 carbon atoms in a molecule or esters with a boiling point below 180° C.

2. The method of claim 1, wherein the tin (IV) acid sol is obtained by the reaction of a compound selected from the group consisting of tin (II) chloride, tin (II) oxalate and tin (II) acetate with hydrogen peroxide in an organic medium, the dopant being added during or after the formation of the tin (IV) acid sol.

3. The method of claim 2, wherein the dopant is selected from the group consisting of tin (II) fluoride and tin (II) trifluoroacetate.

4. The method of claim 2, further comprising adding the doping agent after the formation of the tin (IV) acid sol, provided that tin (II) fluoride, hydrofluoric acid, trifluoroacetic acid or its anhydride or hexafluorosilicic acid is used as the dopant.

5. The method of claims 1 or 2, comprising increasing the tin content of the tin(IV) acid sol by adding alkyl tin oxides, the alkyl group or groups of which have 6 carbon atoms.

6. The method of claims 1 or 2, wherein the tin (IV) acid sol contains from about 100 up to about 1,200 g/L of tin, and the molar ratio of tin to fluorine is between about 1:0.1 and 1:0.8.

7. The method of claim 6, wherein the tin (IV) acid sol contains from about 200 up to about 500 g/L of tin.

* * * * *